(12) United States Patent
Cheng et al.

(10) Patent No.: US 11,735,041 B2
(45) Date of Patent: Aug. 22, 2023

(54) ROUTE-SPECIFIC SERVICES FOR CONNECTED AUTOMATED VEHICLE HIGHWAY SYSTEMS

(71) Applicant: CAVH LLC, Fitchburg, WI (US)

(72) Inventors: Yang Cheng, Middleton, WI (US); Bin Ran, Fitchburg, WI (US); Zhen Zhang, Madison, WI (US); Tianyi Chen, Madison, WI (US); Shen Li, Madison, WI (US); Shuoxuan Dong, Madison, WI (US); Kunsong Shi, Madison, WI (US); Jian Zhang, Madison, WI (US); Xia Wan, Fitchburg, WI (US); Xiaoxuan Chen, Madison, WI (US); Linchao Li, Madison, WI (US); Qin Li, Madison, WI (US); Linghui Xu, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 664 days.

(21) Appl. No.: 16/506,502

(22) Filed: Jul. 9, 2019

(65) Prior Publication Data

US 2020/0020228 A1 Jan. 16, 2020

Related U.S. Application Data

(60) Provisional application No. 62/696,182, filed on Jul. 10, 2018.

(51) Int. Cl.
*G05D 1/00* (2006.01)
*G08G 1/09* (2006.01)
(Continued)

(52) U.S. Cl.
CPC ............ *G08G 1/09* (2013.01); *G05D 1/0061* (2013.01); *G05D 1/0088* (2013.01);
(Continued)

(58) Field of Classification Search
CPC ...... G08G 1/09; G08G 1/0116; G08G 1/0125; G08G 1/0145; G08G 1/07;
(Continued)

(56) References Cited

U.S. PATENT DOCUMENTS 3,824,469 A 7/1974 Ristenbatt
4,023,017 A 5/1977 Ceseri
(Continued)

FOREIGN PATENT DOCUMENTS

CN 102768768 B 11/2012
CN 103854473 A 6/2014
(Continued)

OTHER PUBLICATIONS

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.
(Continued)

*Primary Examiner* — Shardul D Patel
(74) *Attorney, Agent, or Firm* — Casimir Jones S.C.; Thomas A. Isenbarger; Brian F. Bradley

(57) ABSTRACT

The technology provides systems and methods for a system providing customized and route-specific operations, control, and services for connected and automated vehicles (CAVs) according to user origin and destination requests, based on connected automated vehicle highway (CAVH) systems which includes an intelligent road infrastructure system providing transportation management and operations and individual vehicle control for CAV.

25 Claims, 9 Drawing Sheets

(51) Int. Cl.
*H04W 12/08* (2021.01)
*H04L 9/40* (2022.01)
*G08G 1/01* (2006.01)
*H04W 12/02* (2009.01)
*G06F 21/62* (2013.01)
*H04L 67/10* (2022.01)
*H04W 4/44* (2018.01)

(52) U.S. Cl.
CPC ......... *G08G 1/0116* (2013.01); *G08G 1/0125* (2013.01); *H04L 63/1416* (2013.01); *H04W 12/02* (2013.01); *H04W 12/08* (2013.01); *G05D 2201/0213* (2013.01); *G06F 21/6245* (2013.01); *H04L 67/10* (2013.01); *H04W 4/44* (2018.02)

(58) Field of Classification Search
CPC ....... G08G 1/096725; G08G 1/096741; G08G 1/096775; G08G 1/096783; G08G 1/096811; G08G 1/096838; G08G 1/096844; G08G 1/164; G08G 1/166; G05D 1/0061; G05D 1/0088; G05D 2201/0213; G05D 1/00; H04L 63/1416; H04L 67/10; H04L 67/12; H04L 63/102; H04L 63/1441; H04W 12/02; H04W 12/08; H04W 4/44; H04W 4/02; H04W 4/027; H04W 4/024; H04W 12/12; G06F 21/6245
USPC .......................................................... 701/25
See application file for complete search history.

(56) References Cited

U.S. PATENT DOCUMENTS

| | | | |
|---|---|---|---|
| 4,704,610 A | 11/1987 | Smith et al. | |
| 4,962,457 A | 10/1990 | Chen et al. | |
| 5,420,794 A * | 5/1995 | James | G08G 1/096725 701/117 |
| 5,504,683 A | 4/1996 | Gurmu | |
| 5,625,559 A | 4/1997 | Egawa | |
| 5,732,785 A | 3/1998 | Ran et al. | |
| 6,028,537 A | 2/2000 | Suman et al. | |
| 6,064,318 A * | 5/2000 | Kirchner, III | G08G 1/096716 340/905 |
| 6,317,682 B1 | 11/2001 | Ogura et al. | |
| 6,829,531 B2 | 12/2004 | Lee | |
| 6,900,740 B2 | 5/2005 | Bloomquist et al. | |
| 7,295,904 B2 * | 11/2007 | Kanevsky | B60K 35/00 701/36 |
| 7,324,893 B2 | 1/2008 | Yamashita et al. | |
| 7,343,243 B2 | 3/2008 | Smith | |
| 7,382,274 B1 | 6/2008 | Kermani et al. | |
| 7,418,346 B2 | 6/2008 | Breed et al. | |
| 7,421,334 B2 | 9/2008 | Dahlgren et al. | |
| 7,425,903 B2 | 9/2008 | Boss et al. | |
| 7,554,435 B2 | 6/2009 | Tengler et al. | |
| 7,725,249 B2 | 5/2010 | Kickbusch | |
| 7,860,639 B2 | 12/2010 | Yang | |
| 7,894,951 B2 * | 2/2011 | Norris | G05D 1/0088 701/36 |
| 7,979,172 B2 | 7/2011 | Breed | |
| 8,352,112 B2 | 1/2013 | Mudalige | |
| 8,527,139 B1 | 9/2013 | Yousuf | |
| 8,589,070 B2 | 11/2013 | Ban | |
| 8,630,795 B2 | 1/2014 | Breed et al. | |
| 8,682,511 B2 | 3/2014 | Andreasson | |
| 8,972,080 B2 | 3/2015 | Shida et al. | |
| 9,053,636 B2 * | 6/2015 | Gordon | G08G 1/09 |
| 9,076,332 B2 | 7/2015 | Myr | |
| 9,120,485 B1 | 9/2015 | Dolgov | |
| 9,182,951 B1 | 11/2015 | Ormerod et al. | |
| 9,349,055 B1 | 5/2016 | Ogale | |
| 9,494,935 B2 | 11/2016 | Okumura et al. | |
| 9,495,874 B1 | 11/2016 | Zhu et al. | |
| 9,595,190 B2 | 3/2017 | Mccrary | |
| 9,646,496 B1 | 5/2017 | Miller et al. | |
| 9,654,511 B1 * | 5/2017 | Brocco | H04L 63/102 |
| 9,665,101 B1 | 5/2017 | Templeton | |
| 9,731,713 B2 | 8/2017 | Horii | |
| 9,799,224 B2 | 10/2017 | Okamoto | |
| 9,845,096 B2 | 12/2017 | Urano et al. | |
| 9,940,840 B1 | 4/2018 | Schubert et al. | |
| 9,964,948 B2 | 5/2018 | Ullrich et al. | |
| 10,074,223 B2 | 9/2018 | Newman | |
| 10,074,273 B2 | 9/2018 | Yokoyama et al. | |
| 10,380,886 B2 * | 8/2019 | Ran | G08G 1/0129 |
| 10,692,365 B2 * | 6/2020 | Ran | G08G 1/0145 |
| 2002/0005637 A1 * | 1/2002 | Frisch | B60R 21/2342 280/736 |
| 2002/0008637 A1 * | 1/2002 | Lemelson | G08G 1/07 340/907 |
| 2003/0045995 A1 * | 3/2003 | Lee | G08G 1/096741 701/439 |
| 2004/0145496 A1 | 7/2004 | Ellis | |
| 2004/0230393 A1 | 11/2004 | Tzamaloukas | |
| 2005/0060069 A1 | 3/2005 | Breed et al. | |
| 2005/0102098 A1 | 5/2005 | Montealegre et al. | |
| 2005/0209769 A1 | 9/2005 | Yamashita et al. | |
| 2005/0222760 A1 | 10/2005 | Cabral et al. | |
| 2006/0142933 A1 | 6/2006 | Feng | |
| 2006/0226968 A1 | 10/2006 | Tengler et al. | |
| 2006/0251498 A1 | 11/2006 | Buzzoni et al. | |
| 2007/0093997 A1 | 4/2007 | Yang et al. | |
| 2007/0146162 A1 | 6/2007 | Tengler et al. | |
| 2008/0042815 A1 | 2/2008 | Breed et al. | |
| 2008/0095163 A1 | 4/2008 | Chen et al. | |
| 2008/0150786 A1 * | 6/2008 | Breed | G05D 1/0274 342/53 |
| 2008/0161986 A1 * | 7/2008 | Breed | G01S 19/43 701/23 |
| 2008/0161987 A1 | 7/2008 | Breed | |
| 2008/0275646 A1 * | 11/2008 | Perng | G06Q 10/047 701/414 |
| 2010/0013629 A1 | 1/2010 | Sznaider et al. | |
| 2010/0256836 A1 * | 10/2010 | Mudalige | G08G 1/164 701/2 |
| 2010/0256852 A1 * | 10/2010 | Mudalige | G08G 1/164 701/24 |
| 2011/0224892 A1 | 9/2011 | Speiser | |
| 2011/0227757 A1 | 9/2011 | Chen et al. | |
| 2012/0017262 A1 * | 1/2012 | Kapoor | H04L 63/1408 726/1 |
| 2012/0022776 A1 | 1/2012 | Razavilar et al. | |
| 2012/0059574 A1 | 3/2012 | Hada | |
| 2012/0105639 A1 | 5/2012 | Stein et al. | |
| 2012/1437886 | 6/2012 | Karner | |
| 2012/0283910 A1 | 11/2012 | Lee et al. | |
| 2012/0303807 A1 | 11/2012 | Akelbein et al. | |
| 2013/0116915 A1 * | 5/2013 | Ferreira | G08G 1/163 701/117 |
| 2013/0137457 A1 | 5/2013 | Potkonjak | |
| 2013/0138714 A1 | 5/2013 | Ricci | |
| 2013/0141580 A1 | 6/2013 | Stein et al. | |
| 2013/0204484 A1 | 8/2013 | Ricci | |
| 2013/0218412 A1 | 8/2013 | Ricci | |
| 2013/0297140 A1 | 11/2013 | Montemerlo et al. | |
| 2013/0297196 A1 | 11/2013 | Shida | |
| 2014/0112410 A1 | 4/2014 | Yokoyama | |
| 2014/0219505 A1 | 8/2014 | Kindo et al. | |
| 2014/0222322 A1 | 8/2014 | Durekovic | |
| 2014/0278026 A1 | 9/2014 | Taylor | |
| 2014/0278052 A1 | 9/2014 | Slavin et al. | |
| 2014/0354451 A1 | 12/2014 | Tonguz et al. | |
| 2015/0153013 A1 | 6/2015 | Zhao et al. | |
| 2015/0169018 A1 | 6/2015 | Rogo et al. | |
| 2015/0197247 A1 | 7/2015 | Ichinowaka | |
| 2015/0199685 A1 | 7/2015 | Betancourt et al. | |
| 2015/0211868 A1 | 7/2015 | Matsushita et al. | |
| 2015/0310742 A1 | 10/2015 | Albornoz | |
| 2016/0042303 A1 | 2/2016 | Medina et al. | |

(56) References Cited

U.S. PATENT DOCUMENTS

| | | |
|---|---|---|
| 2016/0086391 A1 | 3/2016 | Ricci |
| 2016/0110820 A1 | 4/2016 | Fleck et al. |
| 2016/0132705 A1 | 5/2016 | Kovarik et al. |
| 2016/0142492 A1 | 5/2016 | Fang et al. |
| 2016/0148440 A1 | 5/2016 | Kwak |
| 2016/0216130 A1 | 7/2016 | Abramson et al. |
| 2016/0221186 A1* | 8/2016 | Perrone ............... B25J 9/1661 |
| 2016/0231746 A1 | 8/2016 | Hazelton et al. |
| 2016/0238703 A1 | 8/2016 | Liu et al. |
| 2016/0325753 A1 | 11/2016 | Stein et al. |
| 2016/0328272 A1 | 11/2016 | Ahmed et al. |
| 2016/0330036 A1 | 11/2016 | Zhou et al. |
| 2016/0370194 A1 | 12/2016 | Colijn et al. |
| 2017/0026893 A1 | 1/2017 | Lagassey |
| 2017/0039435 A1 | 2/2017 | Ogale et al. |
| 2017/0046883 A1 | 2/2017 | Gordon et al. |
| 2017/0053529 A1 | 2/2017 | Yokoyama et al. |
| 2017/0075195 A1 | 3/2017 | Stein et al. |
| 2017/0085632 A1 | 3/2017 | Cardote |
| 2017/0090994 A1 | 3/2017 | Jubinski et al. |
| 2017/0109644 A1 | 4/2017 | Nariyambut Murali et al. |
| 2017/0131435 A1 | 5/2017 | Peacock et al. |
| 2017/0206783 A1 | 7/2017 | Miller |
| 2017/0262790 A1 | 9/2017 | Khasis |
| 2017/0276492 A1* | 9/2017 | Ramasamy ........... B60W 40/04 |
| 2017/0324817 A1 | 11/2017 | Oliveir a et al. |
| 2017/0337571 A1 | 11/2017 | Bansal et al. |
| 2017/0339224 A1 | 11/2017 | Condeixa et al. |
| 2017/0357980 A1 | 12/2017 | Bakun et al. |
| 2018/0018216 A1 | 1/2018 | Halford et al. |
| 2018/0053413 A1* | 2/2018 | Patil ........................ G01S 11/14 |
| 2018/0065637 A1 | 3/2018 | Bassindale |
| 2018/0114079 A1 | 4/2018 | Myers et al. |
| 2018/0151064 A1 | 5/2018 | Xu et al. |
| 2018/0158327 A1 | 6/2018 | Gärtner |
| 2018/0190116 A1 | 7/2018 | Bauer et al. |
| 2018/0262887 A1 | 9/2018 | Futaki |
| 2018/0299274 A1 | 10/2018 | Moghe et al. |
| 2018/0308344 A1 | 10/2018 | Ravindranath et al. |
| 2018/0336780 A1 | 11/2018 | Ran et al. |
| 2019/0096238 A1 | 3/2019 | Ran et al. |
| 2019/0150082 A1* | 5/2019 | Kedalagudde .......... H04W 4/46 370/329 |
| 2019/0202476 A1* | 7/2019 | Tao ..................... B60W 30/095 |
| 2019/0244518 A1 | 8/2019 | Yang et al. |
| 2019/0244521 A1 | 8/2019 | Ran et al. |
| 2019/0316919 A1* | 10/2019 | Keshavamurthy .......................... G08G 1/096844 |
| 2020/0005644 A1* | 1/2020 | Ichimaru .......... G08G 1/096775 |

FOREIGN PATENT DOCUMENTS

| | | |
|---|---|---|
| CN | 104485003 B | 4/2015 |
| CN | 106710203 A | 5/2017 |
| CN | 107665578 A | 2/2018 |
| CN | 107807633 A | 3/2018 |
| CN | 108039053 A | 5/2018 |
| CN | 108447291 A | 8/2018 |
| EP | 2395472 A1 | 12/2011 |
| KR | 20170008703 A | 1/2017 |
| WO | WO 2015/114592 A1 | 8/2015 |
| WO | WO 2016/077027 A1 | 5/2016 |
| WO | WO 2016/135561 A1 | 9/2016 |
| WO | WO 2017/049978 A1 | 3/2017 |
| WO | WO 2017/079474 A2 | 5/2017 |
| WO | WO 2017/115342 A1 | 7/2017 |
| WO | WO 2017/160276 A1 | 9/2017 |
| WO | WO 2018/039134 A1 | 3/2018 |
| WO | WO 2018/132378 | 7/2018 |
| WO | WO 2019/156955 A1 | 8/2019 |
| WO | WO 2019/156956 A1 | 8/2019 |

OTHER PUBLICATIONS

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

BHAT "Travel Modeling in an Era of Connected and Automated Transportation Systems: An Investigation in the Dallas-Fort Worth Area," Techinal Report 122, Center for Transportation Research, Feb. 2017 [retrieved on Sep. 3, 2019]. Retrieved from the Internet: <URL:http://www.caee.utexas.edu/prof/bhat/REPORTS/DSTOP_122.pdf> pp. 1-61.

Conduent™—Toll Collection Solutions, https://www.conduent.com/solution/transportation-solutions/electronic-toll-collection/, retrived on: Nov. 3, 2017, 3 pages.

DOSHI Review of the book "Security for Cloud Storage Systems" MEFHI, Gauridad Campus, India, 2014, pp. 1-2 [retrieved on Sep. 5, 2019]. Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity," FP Think: Effects of Next-Generation Vehicles on Travel Demand and Highway Capacity Feb. 2014, [retrieved on Jun. 13, 2019]. Retrived from the Internet: <URL:http://www.fehrandpeers.com/wp-content/uploads/2015/07/FP_Thing_Next_Gen_White_Paper_FINAL.pdf>pp. 1-39.

Flammini et al. "Wireless sensor networking in the internet of things and cloud computing era." Procedia Engineering 87 (2014): 672-679.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Johri et al.,"A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

Maaß et al., "Data Processing of High-rate low-voltage Distribution Grid Recordings for Smart Grid Monitoring and Analysis," EURASIP Journal on Advances in Signal Processing (2015) 2015:14 DOI 10.1186/s13634-015-02034[retrieved on Sep. 3, 2019]. Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with High Trip Generator Employers." MiamiDadeTPO.org. pp. 1-99 Jan. 31, 2018, [retrieved on Jun. 13, 2019]. Retrieved from the Internet:<URL:http://www.miamidadetpo.org/library/studies/first-mile-last-mile-options-with-high-trip-generator-employers-2017-12.pdf>.

MK5 V2X ,Cohda Wireless,http://cohdawireless.com, retrieved on: Nov. 3, 2017, 2 pages.

National Association of City Transportation Officials. "Blueprint for Autonomous Urbanism". New York, NY10017, www.nacto.org, Fall 2017, [retrieved on Sep. 5, 2019]. Retrieved from the Internet: <URL:https://nacto.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019]. Retrieved from the Internet: <URL:https://www.oregon.gov/ODOT/KOM/VP-TM2-InitialConcepts.PDF>.

Products for Toll Collection—Mobility—Siemens—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

(56) References Cited

OTHER PUBLICATIONS

R-Fans_16 from Beijing Surestar Technology Co. Ltd, http://www.isurestar.com/index.php/en-product-product.html#9, retrieved on: Nov. 3, 2017, 7 pages.
Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.
Society of Automotive Engineers International's new standard J3016: "Taxonomy and Definitions for Terms Related to On-Road Motor Vehicle Automated Driving Systems" 2014, downloaded Sep. 17, 2019, 12 pages.
Southwest Research Institute, Basic Infrastructure Message Development and Standards Support for Connected Vehicles Applications, Apr. 24, 2018. {retrieved on Sep. 3, 2019}. Retrieved from the Internet: <URL:http://www.cts.virginia.edu/wp-content/uploads/2018/12/Task4-Basic-Infrastructure-Message-Development-20180425-Final.pdf> pp. 1-76.
STJ1-3 from Sensortech, http://www.whsensortech.com/, retrieved on Nov. 3, 2017, 2 pages.
StreetWAVE from Savari, http://savari.net/technology/road-side-unit, retrieved on: Nov. 3, 2017, 2 pages.
Surakitbanharn "Connected and Autonomous Vehicles: A Policy Review" Purdue Policy Research Institute, Feb. 2018, retrieved on Sep. 3, 2019, retrieved from the interned: <URL:https://www.purdue.edu/discoverypark/ppri/docs/CATV%20Policy%20Writeup%20Feb%202018.pdf> pp. 1-17.
TDC-GPX2 Lidar of precision-measurement-technologies, http://pmt-fl.com, retrieved on: Nov. 3, 2017, 2 pages.
Teletrac Navman http://drive.teletracnavman.com/, retrieved on: Nov. 3, 2017, 2 pages.
Vector CANalyzer9.0 from vector https://vector.com, retrieved on Nov. 3, 2017, 1 page.
Williams "Transportation Planning Implications of Automated/Connected Vehicles on Texas Highways" Texas A&M Transportation Institute, Apr. 2017, 34 pages.
International Search Report of related PCT/US2018/012961, dated May 10, 2018, 16 pages.
International Search Report of related PCT/US2019/016606, dated Apr. 23, 2019, 21 pages.
International Search Report of related PCT/US2019/016603, dated Apr. 24, 2019, 17 pages.
International Search Report of related PCT/US2019/031304, dated Aug. 9, 2019, 17 pages.
International Search Report of related PCT/US2019/026569, dated Jul. 8, 33 pages.
International Search Report of related PCT/US2019/037963, dated Sep. 10, 2019, 54 pages.
International Search Report of related PCT/US2019/041004, dated Oct. 3, 2019, 18 pages.
International Search Report of related PCT/US2019/040814, dated Oct. 8, 2019, 20 pages.
International Search Report of related PCT/US2019/041008, dated Oct. 8, 2019, 16 pages.
International Search Report of related PCT/US2019/040819, dated Oct. 17, 2019, 41 pages.
International Search Report of related PCT/US2019/039376, dated Oct. 29, 2019, 11 pages.
International Search Report of related PCT/US2019/040809, dated Nov. 15, 2019, 17 pages.

* cited by examiner

ROUTE-SPECIFIC SERVICES FOR CONNECTED AUTOMATED VEHICLE HIGHWAY SYSTEMS

This application claims priority to U.S. provisional patent application Ser. No. 62/696,182, filed Jul. 10, 2018, which is incorporated herein by reference in its entirety.

FIELD

The present technology relates to an intelligent road infrastructure system providing transportation management and operations and individual vehicle control for connected and automated vehicles (CAV), and, more particularly, to a system providing customized and route-specific operations, control, and services for CAVs according to user origin and destination requests.

BACKGROUND

Vehicles that are capable of sensing their environment and navigating without or with reduced human input (e.g., autonomous vehicles) are in development. At present, they are in experimental testing and not in widespread commercial use. Existing approaches require expensive and complicated on-board systems, making widespread implementation a substantial challenge.

SUMMARY

In some embodiments, the technology provides systems and methods for customized and route-specific operations, control, and services for CAVs according to user origin and destination requests. In some embodiments, the technology is facilitated by CAVH system modules and methods. Specifically, the technology provides vehicles with individually customized information and real-time control instructions for the vehicle, e.g., to fulfill driving tasks (e.g., car following, lane changing, and route guidance). In some embodiments, the individually customized information and real-time control instructions for the vehicle are optimized for a specific route according to user origin and destination requests. In some embodiments, the individually customized information and real-time control instructions are provided for the vehicle to drive on, e.g., freeways and urban arterials.

In some embodiments, the technology comprises a connected automated vehicle highway system and methods and/or components thereof as described in U.S. patent application Ser. No. 15/628,331, filed Jun. 20, 2017 and U.S. Provisional Patent Application Ser. No. 62/626,862, filed Feb. 6, 2018, 62/627,005, filed Feb. 6, 2018, 62/655,651, filed Apr. 10, 2018, and 62/669,215, filed May 9, 2018, the disclosure of each of which is herein incorporated by reference in its entirety (referred to herein as a CAVH system). In some embodiments, the technology comprises a cloud system as described in U.S. Provisional Patent Application Ser. No. 62/691,391, incorporated herein by reference in its entirety.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the technology may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

LEGEND

Figure 3:
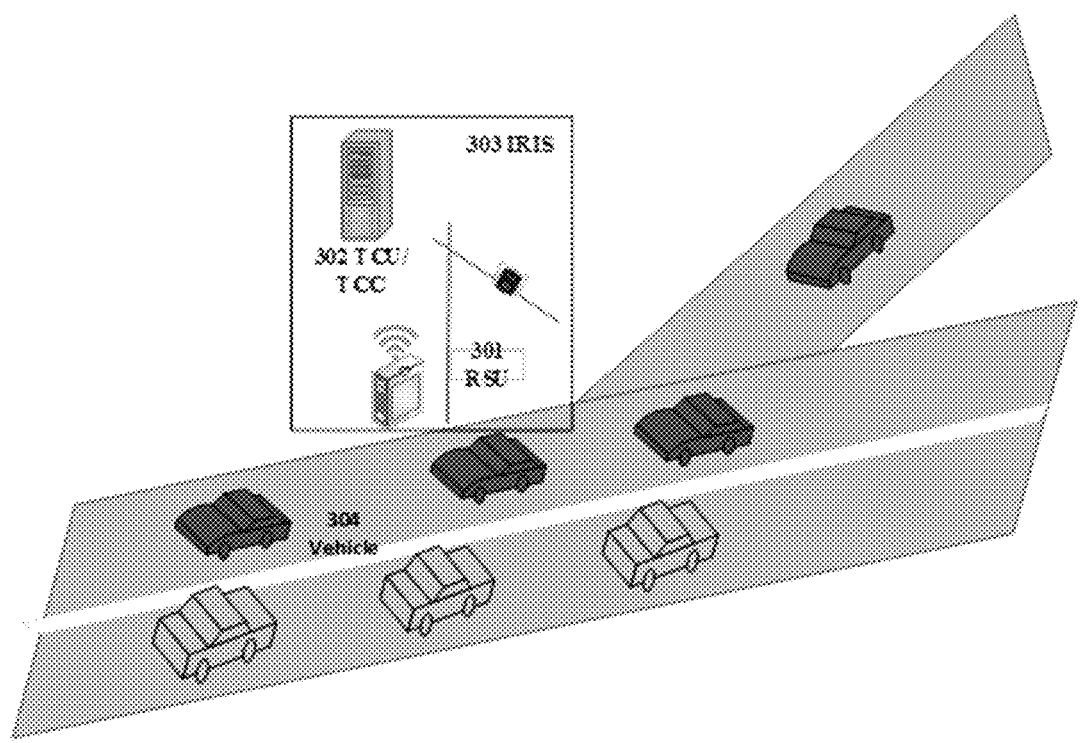
FIG. 3 presents an exemplary method for on-ramp conflict point management.

FIG. 3:
301 RSU: Roadside Unit
302 TCU/TCC: Traffic Control Center/Traffic Control Unit 303 IRIS: Intelligent Road Infrastructure System
304 Vehicle

FIG. 4:

401 RSU: Roadside Unit
402 Traffic control devices
403 TCU/TCC: Traffic Control Center/Traffic Control Unit
404 Vehicle

FIG. 5:

501 Voice command is recognized (e.g., destination, start, stop, accelerate, decelerate, and/or lane change). In some embodiments, the command is not executed if it conflicts with other commands and instructions.
502 Gesture (e.g., the direction of pointing and/or the position of the finger) is recognized and an output is produced. In some embodiments, the output is a direction corresponding to the direction of pointing and/or the position of the finger.
503 Eye-gaze (e.g., eye gaze direction and/or face orientation) is recognized and an output is produced. In some embodiments, the output is a direction corresponding to the directions of the eye gaze direction and/or face orientation. In some embodiments, eye gaze direction and/or face orientation is detected and provides an input of "yes" or "no" in reply to a prompt and/or question provided by the system.
504 Control button is used as a backup of controlling operation with a key.
505 & 506. Touch screen. The touch screen is used for input and output. As input, the touch screen provides for text input and command input by touching. As output, the touch screen shows warning messages, explanation messages, and other information (e.g., velocity, location, map, and other output).
507 Speech synthesis use to render an output message in voice (e.g., when the driver is not able to look at the screen).
508 The output command to control the vehicle is sent to ROS and ROS sends the command to corresponding ECU via CAN bus.
509 A message for broadcast to another vehicle is sent and the message received from other vehicle is sent to the Command/Signal Listener (vehicle side).
510 & 511 RSU sends command to vehicle. Vehicle also sends information (location, velocity) back to RSU.
512 Control signal from vehicle is shown to human (e.g., fuel level, engine condition, engine temperature).
513 Data from sensing devices are input.
514 & 515 Input from and output for human.
516 & 517 Input from and output for vehicle.

FIG. 6:

601 IRIS: Intelligent Road Infrastructure System
602 RSU: Road Side Unit
603 OBU: On Board Unit
604 Vehicle
605 Smart Phone
606 Pedestrian
607 Bicycle

FIG. 8:

801 IRIS: Intelligent Road Infrastructure System
802 Non-IRIS: A road not served by or not part of an Intelligent Road Infrastructure System
803 RSU: Road Side Unit
804 Traffic Light
805 Bike Pavement Marks indicate the road is an IRIS road
806 Bike Pavement Marks indicate the road is a non-IRIS road
807 Pedestrian
808 Bicycle Definitions To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensing-free" method does not comprise a sensing step, a "controller-free" system does not comprise a controller, etc.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

DETAILED DESCRIPTION

In some embodiments, the technology provides systems and methods for a system providing customized and route-specific operations, control, and services for connected and automated vehicles (CAVs) according to user origin and destination requests, based on connected automated vehicle highway (CAVH) systems which includes an intelligent road infrastructure system providing transportation management and operations and individual vehicle control for CAV.

Figure 1:
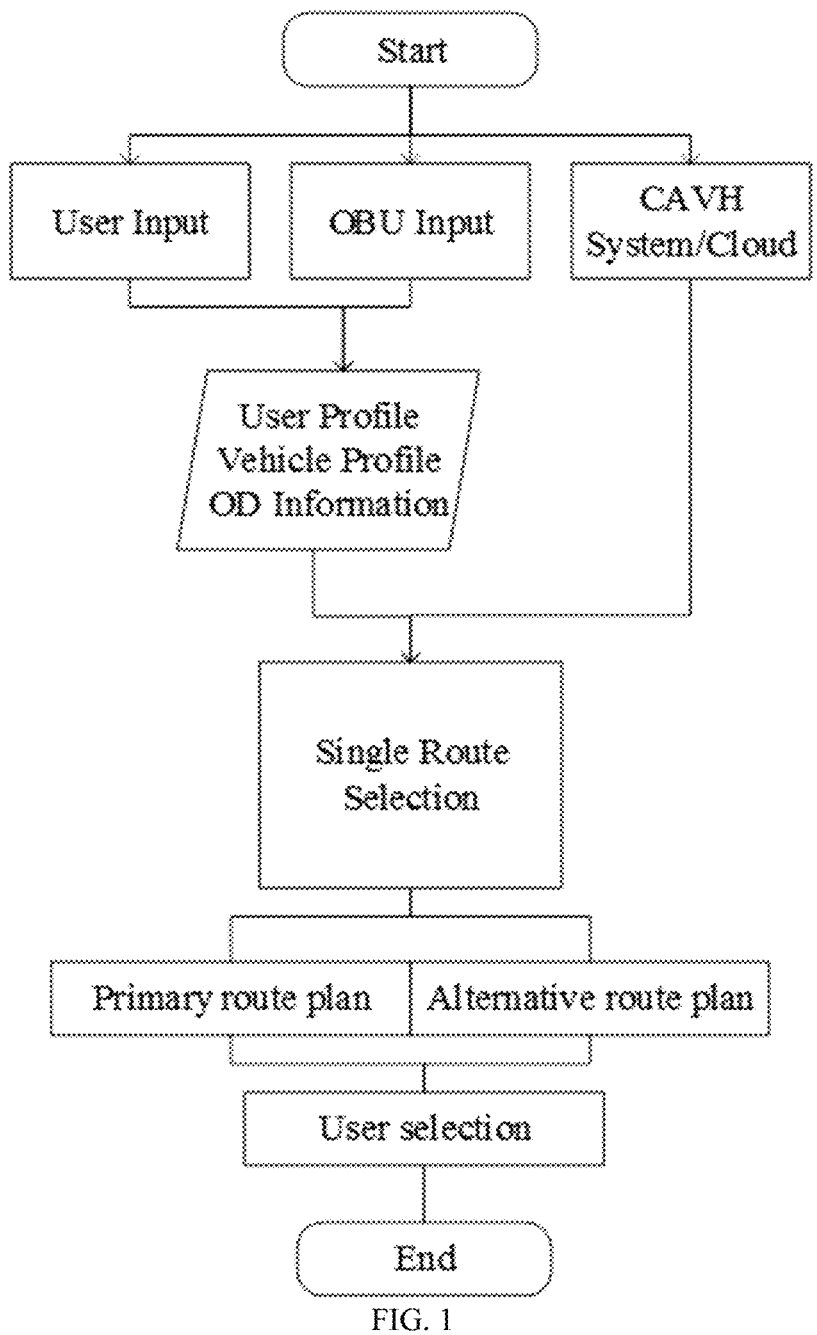
FIG. 1 presents an exemplary method for single route selection.

FIG. 1 shows embodiments of a method for single route selection. Before the trip, the system collects user input data such as user information, preference, OD information (origin and destination information). In some embodiments, the user information is collected from a user interface and/or a personal device. In some embodiments, vehicle information is collected from OBU input such as vehicle type, oil level from SOC, CAVH OBU, etc. In some embodiments, the user and/or vehicle information is used to produce a user profile, vehicle profile, and/or OD information. Then, in some embodiments the CAVH system generates and computes these data with CAVH system and cloud data to compute both primary single route plan and alternative single route plans for user to choose.

Figure 2:
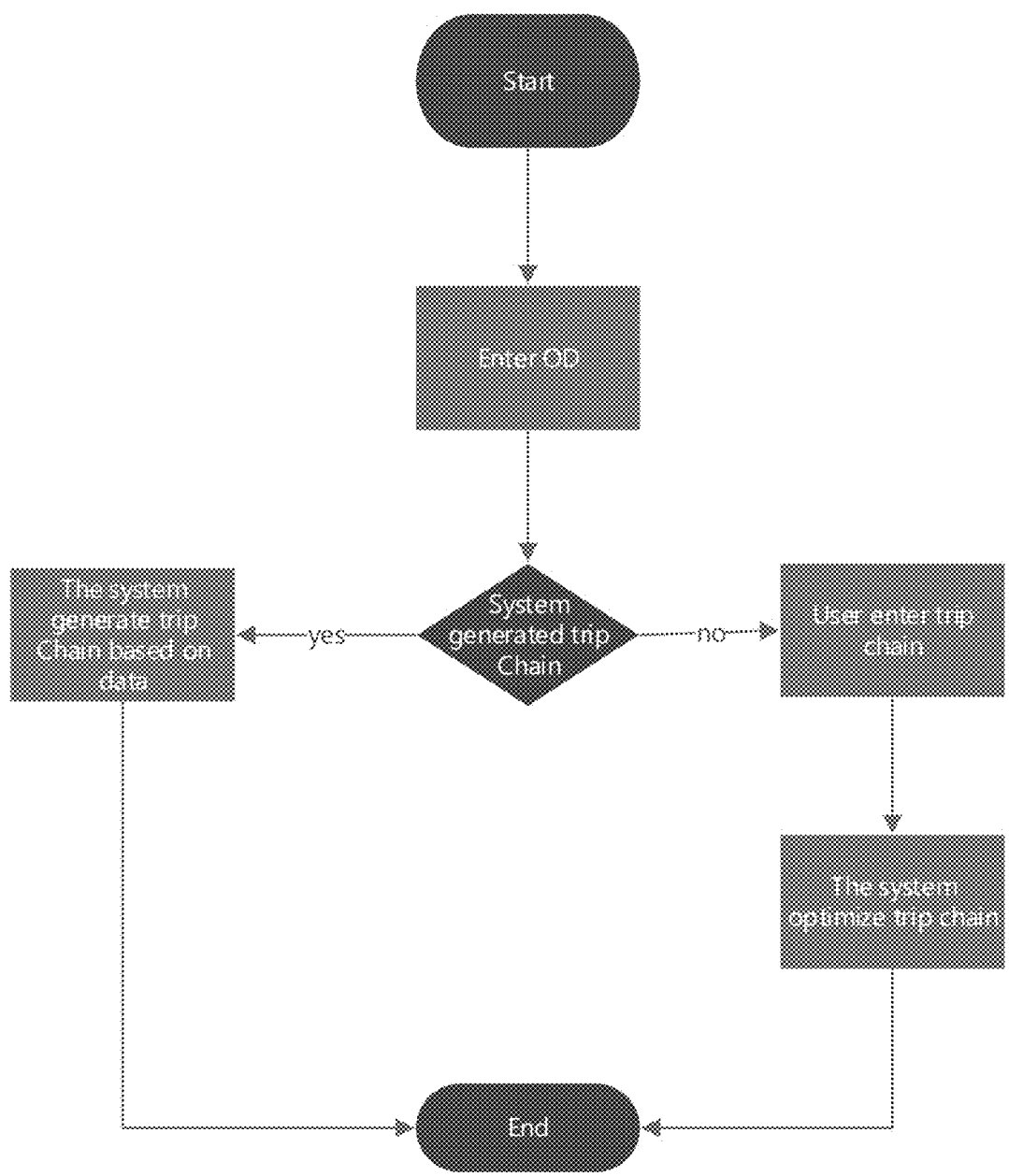
FIG. 2 presents an exemplary method for constructing a trip chain.

FIG. 2 shows embodiments of system configured to perform a method of constructing a trip chain. The system starts with the user entering the origin and the destination. Then the user chooses whether the system generates the trip chain or the user enters the trip chain. If the user chooses the system to generate the trip chain, then the system generates the trip chain based on data. If the user chooses to enter the trip chain, then the system optimizes the entered trip chain.

FIG. 3 shows an example for on-ramp conflict point management. In 303 IRIS system, the 301 RSU senses the surrounding environment at ramp, e.g., 304 vehicles, bicycles, and pedestrians; combines the instructions from 302 TCC/TCU; and detects movements of objects. Based on the collected information, the RSU predicts the future movement of these objects to identify possible conflict points at the ramp. Taking efficiency and safety into consideration, the control instructions are generated by RSU and sent to vehicles.

Figure 4:
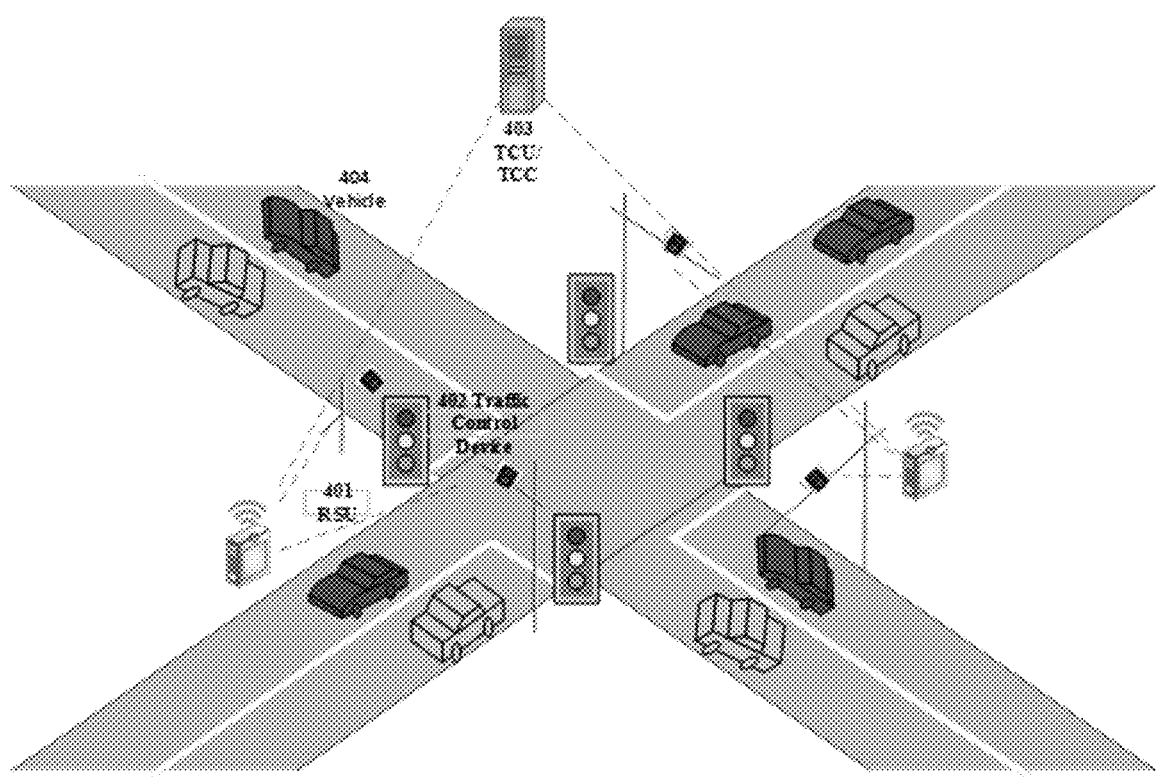
FIG. 4 presents an exemplary method for intersection conflict point management.

FIG. 4 shows an example for intersection conflict point management. At each intersection, the 401 RSU senses the surrounding environment at the intersection, e.g., 404 vehicles, bicycles, and pedestrians; combines traffic control information from 402 traffic control devices and the instructions from 403 TCC/TCU; and detects movements of objects. Based on the collected information, the RSU predicts the future movement of these objects, especially pedestrians and bicycles, to identify possible conflict points at the intersection. Taking efficiency and safety into consideration, control instructions are generated by RSU and sent to vehicles.

Figure 5:
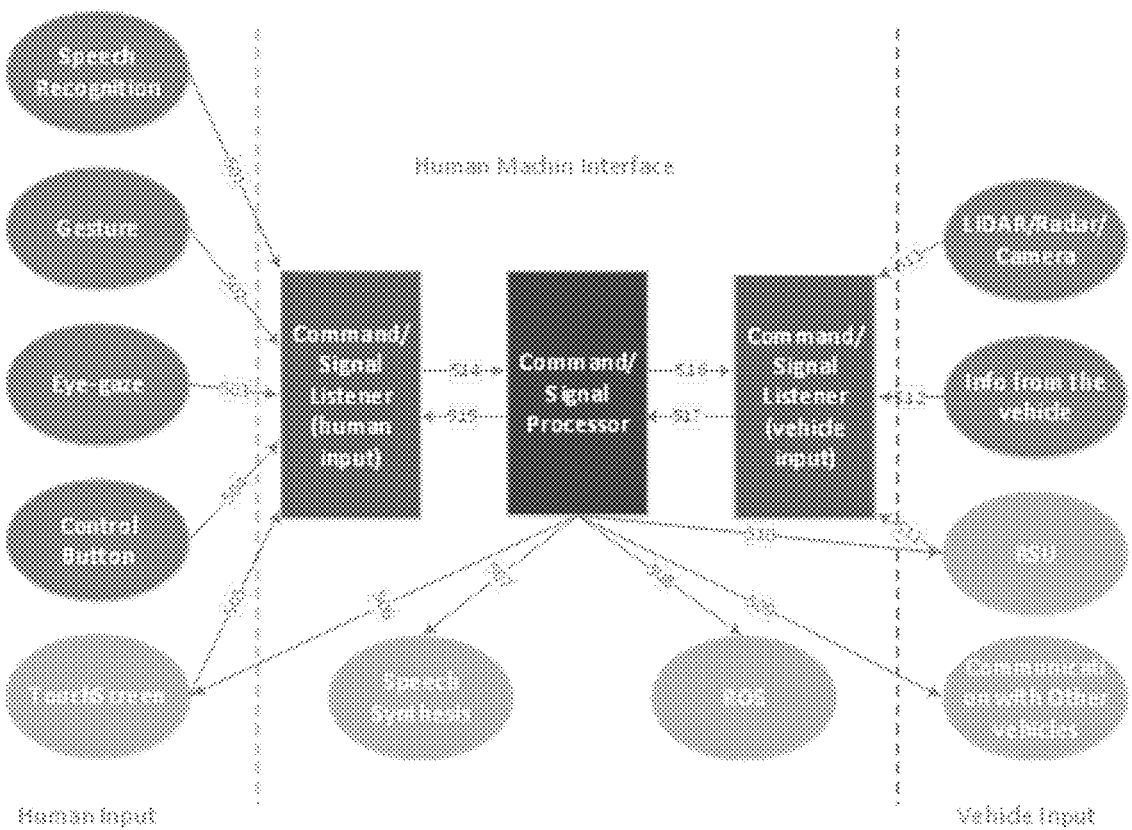
FIG. 5 presents an exemplary embodiment of a human-machine interface.

FIG. 5 is a schematic drawing of a human-machine interface. In FIG. 5, the Command/Signal Processor processes input from a human or a vehicle and sends an output command or message using, e.g., ROS, speech synthesis, touch screen, RSU. In some embodiments, the output or command is sent to other vehicles. Speaking, gestures, eye-gaze, and touch screen or control buttons provide inputs from the human. LIDAR/Radar/Camera, Info from the vehicle, RSU, and/or communication with Other vehicles provide inputs from the vehicle.

Figure 6:
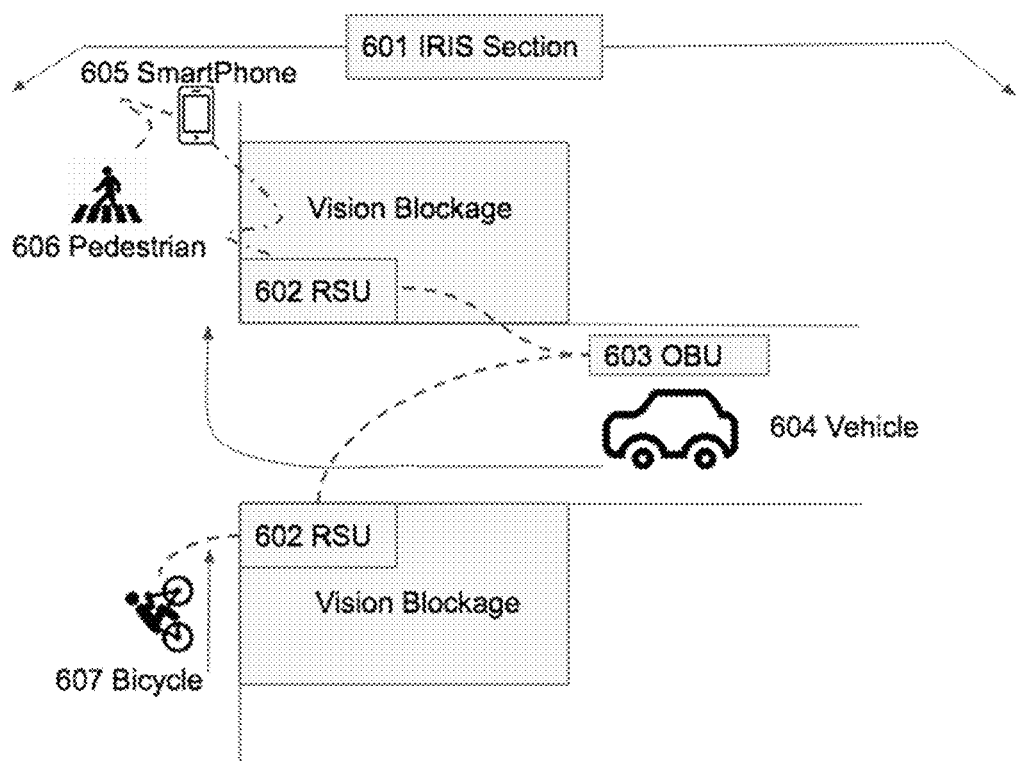
FIG. 6 presents an exemplary method for providing warnings to pedestrians and bicyclists of nearby vehicles.

FIG. 6 shows an example of vehicle warnings produced to warn pedestrians and bicyclists. In 601 IRIS system/IRIS section, the 602 RSU senses the surrounding environment, e.g., 604 vehicles, 607 bicycles, and/or 606 pedestrians. In some embodiments, the RSU detects objects and the movements of objects. Based on this information, the RSU predicts the future movement of these objects to identify possible conflict points on the road.

Figure 7:
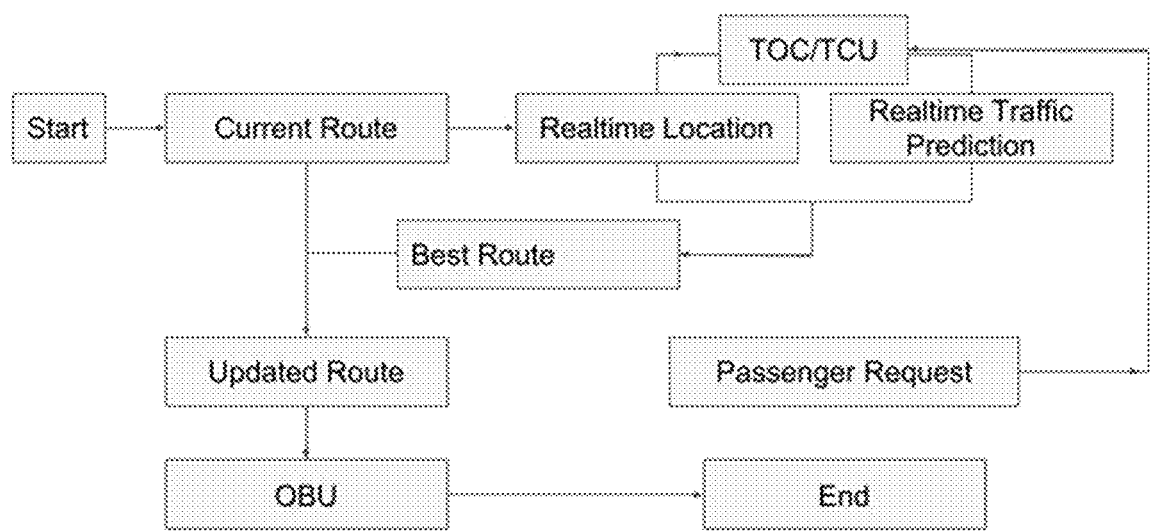
FIG. 7 presents an exemplary method for single route adjustment.

FIG. 7 shows an example of a method for single route adjustment. The system collects current traffic status and user information. The system collects user input and user attribute data, such as the trip destination and user preference. The system generates the best routes based on user information and current traffic status. Current location and real-time traffic are updated to TOC and TCU in real-time. TOC/TCU provides the best routes for vehicle in real-time based on the traffic condition and passenger requests. OBU receives and updates the current routes.

Figure 8:
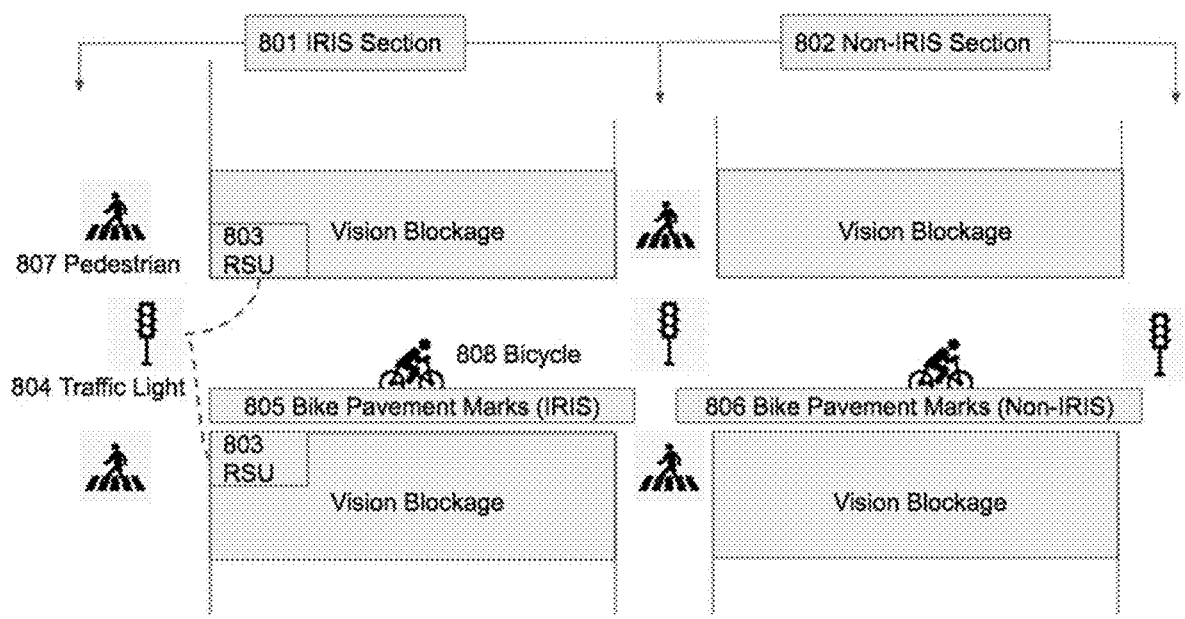
FIG. 8 presents an exemplary method for tracking pedestrians and bicyclists.

FIG. 8 shows an example of tracking methods for pedestrians and bicyclists. In 801 IRIS system/IRIS section, the 803 RSU senses the surrounding environment, e.g., 807 pedestrians, 808 bicycles, and vehicles. In some embodiments, the RSU detects objects and the movements of the objects. Based on this information, RSU predicts the future movement of these objects to identify possible conflict points on the road. 804 Traffic lights adjust the traffic light cycle based on the RSU data. Pavement marks indicate bike lanes and segments of bike lanes that are served by the IRIS and that are not served by the IRIS.

Figure 9:
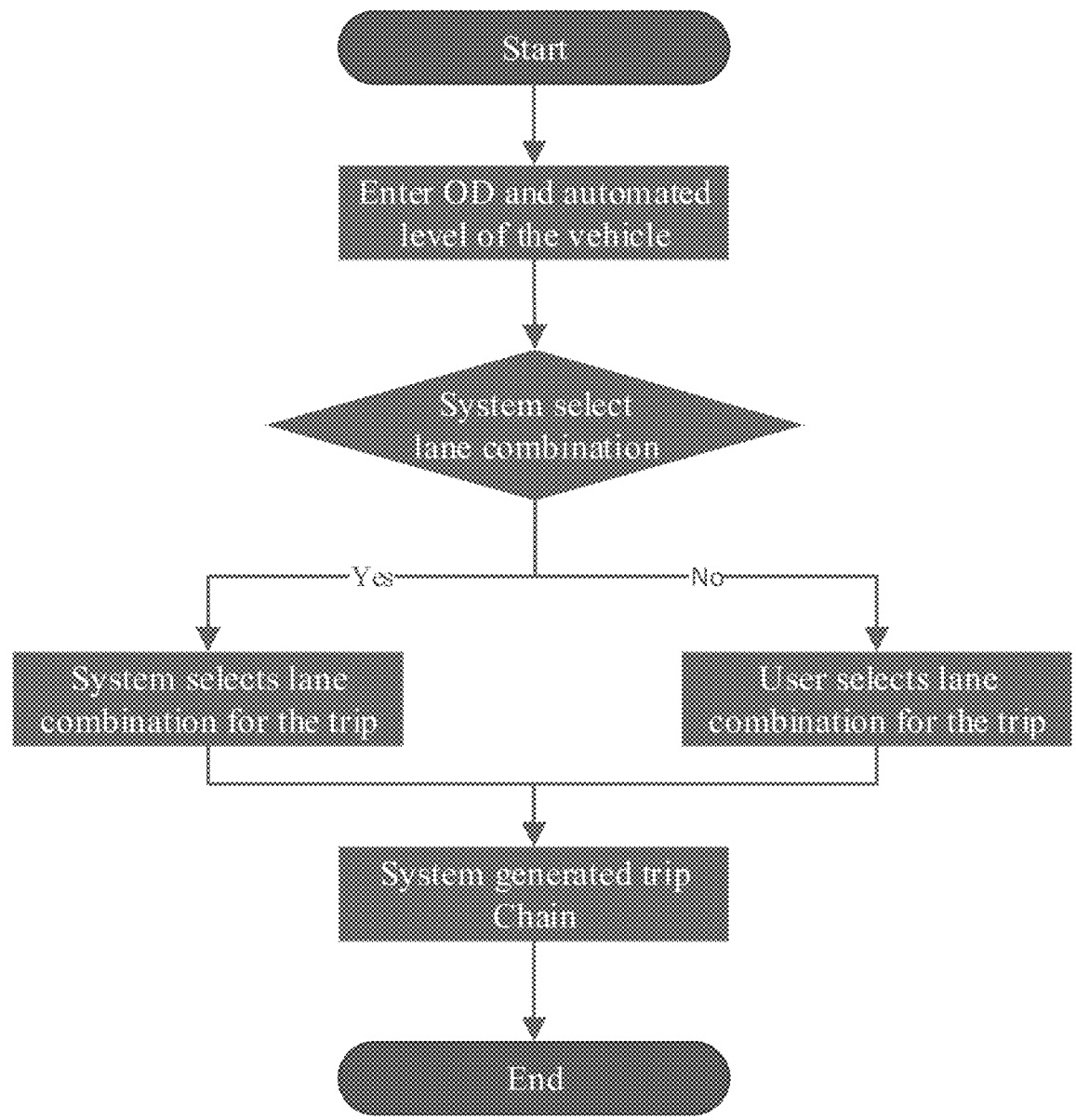
FIG. 9 presents an exemplary method for lane combination selection.

FIG. 9 shows embodiments of a lane combination selection method and lane management system. In the lane management system, input data comprises origin and destination and the automation level of the vehicle. Then, the user decides whether the system selects the lane combination or the user selects the lane combination. After that, the lane combination is obtained and the system generates the trip chain based on the selected lane combination.

We claim:

1. A system providing customized and route-specific operations, vehicle control, and services for connected and automated vehicles (CAV) according to user origin and destination requests, said system comprising the following components:
   a) a network of roadside units (RSUs) comprising RSUs residing in road infrastructure;
   b) vehicle onboard units (OBU) and vehicle interfaces residing in a vehicle;
   and one or more of the following components:
   c) a traffic control unit (TCU) and traffic control center (TCC) network;
   d) traffic operations centers; and
   e) a cloud-based platform configured to provide information and computing services,
   wherein said system is configured to provide customized vehicle operations and control on specific routes customized for individual vehicles,
   wherein vehicle control uses vehicle-specific control instructions comprising longitudinal and lateral position; speed; and steering and control for an individual connected and automated vehicle,
   wherein said RSUs are configured to conduct transportation behavior prediction and management, provide planning and decision making, and generate and provide vehicle-specific control instruction including longitudinal and lateral position; speed; and steering and control; and
   wherein said system is configured to perform first-mile and last-mile methods comprising:
   obtaining user input for trip destination and/or stops;
   producing a trip plan using said user input;
   obtaining user adjustment or confirmation of said trip plan;
   gradually transferring vehicle control from the user to the system during the first mile of the trip; and
   gradually transferring vehicle control from the system to the user during the last mile of the trip and/or parking the vehicle.

2. The system of claim 1 configured to provide individual vehicles with detailed customized information and time-sensitive control instructions, including longitudinal and lateral position; speed; and steering and control, for vehicles to fulfill driving tasks and to provide operations and maintenance services for vehicles on both freeways and urban arterials.

3. The system of claim 1, wherein the system is managed as an open platform for a CAVH system configured to support third party applications and services and to provide interfaces for external agency requests and services.

4. The system of claim 1, wherein the system is configured to provide:
   a) sensing from the RSUs;
   b) transportation behavior prediction and management from the RSUs;
   c) planning and decision making from the RSUs; and
   d) vehicle control with vehicle-specific control instructions from the RSUs.

5. The system of claim 1, further comprising:
   a) a component configured to provide real-time communication via wired and wireless media;
   b) a power supply network; and
   c) a cyber-safety, security, and privacy protection system for automated driving.

6. The system of claim 5, wherein said cyber-safety and security system for CAVH system security and protection is configured to provide:
   a) network-level protection to minimize and/or prevent unauthorized network access;
   b) cloud-level protection to secure vehicle surrounding data, vehicle status data, and traffic state data stored in the cloud; and
   c) application-level protection to prevent various cyber threats using fuzzing and penetration testing.

7. The system of claim 6, wherein said cyber threats for CAVH system comprise one or more of:
   a) obtaining confidential personal information;
   b) corrupting, damaging, or destroying information; and
   c) preventing access to information;
   wherein the information refers to vehicle surrounding data, vehicle status data, or traffic state data.

8. The system of claim 1, wherein said cloud-based platform is configured to provide information services, external services, and compute resources to said system, and provides the networks of RSUs and TCC/TCUs with information and computing services, including Control as a service (CCaaS), providing additional control capability, including generating and providing vehicle-specific control instruction comprising longitudinal and lateral position; speed; and steering and control, as a service for the system.

9. The system of claim 1 configured to perform a route selection method comprising:
   a) obtaining user inputs for OD information, vehicle information, and/or user preference,
   b) selecting a route based on user inputs; and
   c) calibrating a route using collected historical routing data regarding safety, mobility, users' opinions, and traffic conditions;
   wherein the route selection method is implemented by the CAVH system.

10. The system of claim 1 configured to pull data from the cloud platform and/or third party sources for road segments on the selected route that are not covered by the system or not covered completely by the system.

11. The system of claim 1 configured to perform:
    a) an automatic trip generation method for automated driving, comprising generating an optimized stop sequence and corresponding routes based on user requests, sensing information, and the operational status of said system;
    b) a manual trip generation method comprising obtaining a stop sequence from a user and calculating suggested routes for selection by a user.

12. The system of claim 1 configured to assign priority to users to achieve automated driving based on:
    location of emergency vehicles,
    fee payment options of users,
    vehicle occupancy,
    arrival time requests,
    automation levels of vehicles, and
    road coverage of the CAVH system.

13. The system of claim 1 configured to provide en route services to vehicles, wherein said en route services perform driving tasks for vehicles at a microscopic level, mesoscopic level, and macroscopic level.

14. The system of claim 1 configured to perform a method for conflict point control comprising:
    a) detecting the movement of vehicles, objects, and/or pedestrians at a conflict point;
    b) predicting the movement of said vehicles, objects, and/or pedestrians at said conflict point;
    c) identifying potential conflicts of said vehicles, objects, and/or pedestrians; and
    d) providing control instructions, including longitudinal and lateral position; speed; and steering and control, to vehicles to prevent conflicts and to maximize efficiency and safety.

15. The system of claim 1 configured to provide warning messages to vehicles and/or to pedestrians and non-motor vehicles, wherein said warning messages provided to vehicles comprise information describing location, type, and movement of vulnerable objects that cause potential risks for said vehicles and said warning messages provided to pedestrians and non-motor vehicles comprise information describing location, type, and movement of vehicles that cause potential risks to said pedestrians and non-motor vehicles.

16. The system of claim 1 configured to perform prediction and management methods for walking, cycling, public transit, and private vehicle travel modes, wherein said prediction and management methods comprise:
    a) modeling a road network; and
    b) relating traffic conditions to external information sources.

17. The system of claim 1 configured to manage multi-mode transit by providing one or more of
    ramp metering,
    variable speed limit,
    driver information,
    variable message signs, and/or
    dynamic route guidance.

18. The system of claim 1 configured to adjust routes in real-time to update routes for events, user requests, a change of destination, and a change in traffic condition at the macroscopic level, wherein the TCU and TCC network suggest the best route based on the request of a passenger and real-time traffic; and
    at the microscopic level, wherein RSUs control or suggest the lane change behavior of the vehicles.

19. The system of claim 1 configured to perform lane management methods to provide optimal route combinations according to vehicle automated levels, said methods comprising:

a) controlling access to dedicated lanes by identifying automated vehicles, intercepting vehicles not authorized to use dedicated lanes, and separating automated and manual vehicles;
b) providing reminders to drivers of non-automated vehicles in non-dedicated lanes to change lanes, to overtake, to avoid an incident, and/or to avoid adverse weather; and/or
c) converting a dedicated lane to a non-dedicated lane and/or converting a non-dedicated lane to a dedicated lane.

20. The system of claim 1 configured to perform:
(1) active vehicle localization methods comprising sending a vehicle location from a vehicle to an RSU; and/or
(2) passive vehicle localization methods comprising determining a vehicle location by an RSU based on devices installed on a road or on a vehicle.

21. The system of claim 1 configured to track the movement of bikes and pedestrians.

22. The system of claim 1, wherein said OBU and vehicle interfaces are configured to exchange information between user and OBU using one or more of
speech recognition;
gesture recognition;
eye-gaze recognition;
a touch screen and/or button; and/or
speech synthesis.

23. The system of claim 1, wherein said OBU and vehicle interfaces are configured to perform methods comprising:
a) receiving instructions from an RSU;
b) receiving sensor data from LIDAR, RADAR, and/or a camera;
c) communicating with other vehicles using vehicle-to-vehicle (V2V) communication;
d) alerting a driver; and
e) providing a robot operating system.

24. The system of claim 1, wherein said OBU and vehicle interfaces comprise
a) a human takeover interface configured to allow a human to assume vehicle control; and
b) an emergency process interface configured to allow the system to detect or receive emergency information from a driver or a passenger.

25. A system providing customized and route-specific operations, vehicle control, and services for connected and automated vehicles (CAV) according to user origin and destination requests, said system comprising the following components:
a) a network of roadside units (RSUs) comprising RSUs residing in road infrastructure;
b) vehicle onboard units (OBU) and vehicle interfaces residing in a vehicle; and one or more of the following components:
c) a traffic control unit (TCU) and traffic control center (TCC) network;
d) traffic operations centers; and
e) a cloud-based platform configured to provide information and computing services,
wherein said system is configured to provide customized vehicle operations and control on specific routes customized for individual vehicles,
wherein vehicle control uses vehicle-specific control instructions comprising longitudinal and lateral position; speed; and steering and control for an individual connected and automated vehicle,
wherein said RSUs are configured to conduct transportation behavior prediction and management, provide planning and decision making, and generate and provide vehicle-specific control instruction including longitudinal and lateral position; speed;
and steering and control; and
wherein the system is configured to perform lane management methods to provide optimal route combinations according to vehicle automated levels, said lane management methods comprising:
controlling access to dedicated lanes by identifying automated vehicles, intercepting vehicles not authorized to use dedicated lanes, and separating automated and manual vehicles;
providing reminders to drivers of non-automated vehicles in non-dedicated lanes to change lanes, to overtake, to avoid an incident, and/or to avoid adverse weather; and/or
converting a dedicated lane to a non-dedicated lane and/or converting a non-dedicated lane to a dedicated lane.

\* \* \* \* \*